United States Patent
Guo et al.

(10) Patent No.: US 10,929,988 B2
(45) Date of Patent: Feb. 23, 2021

(54) METHOD AND DEVICE FOR PROCESSING IMAGE, AND ELECTRONIC DEVICE

(71) Applicant: Guangdong Oppo Mobile Telecommunications Corp., Ltd., Guangdong (CN)

(72) Inventors: Ziqing Guo, Guangdong (CN); Haitao Zhou, Guangdong (CN); Kamwing Au, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/526,648

(22) Filed: Jul. 30, 2019

(65) Prior Publication Data
US 2020/0043187 A1    Feb. 6, 2020

(30) Foreign Application Priority Data

Aug. 1, 2018  (CN) .......................... 201810864801.0
Aug. 1, 2018  (CN) .......................... 201810867074.3
Aug. 1, 2018  (CN) .......................... 201810867076.2

(51) Int. Cl.
G06T 7/33     (2017.01)
G06T 5/50     (2006.01)
H04N 5/225    (2006.01)

(52) U.S. Cl.
CPC .................. *G06T 7/33* (2017.01); *G06T 5/50* (2013.01); *H04N 5/2256* (2013.01);
(Continued)

(58) Field of Classification Search
CPC ... G06T 7/33; G06T 5/50; G06T 2207/10028; G06T 2207/10048; G06T 2207/20221;
(Continued)

(56) References Cited

U.S. PATENT DOCUMENTS 8,345,989 B1 * 1/2013 Bresolin .................. G06K 9/00
382/218
8,692,198 B2   4/2014 Jiang et al.
(Continued)

FOREIGN PATENT DOCUMENTS

CN        101567966 A    10/2009
CN        201349347 Y    11/2009
(Continued)

OTHER PUBLICATIONS

ISR for PCT application PCT/CN2019/080429 dated Jun. 19, 2019 with English Translation.
(Continued)

*Primary Examiner* — Dramos Kalapodas

(57) ABSTRACT

A method and a device for processing an image, an electronic device and a computer readable storage medium are provided. The method includes: obtaining an image capturing instruction; capturing an infrared image and an RGB image based on the image capturing instruction, extracting a first feature of the infrared image and extracting a second feature of the RGB image; and performing an alignment operation based on the first feature and the second feature.

20 Claims, 9 Drawing Sheets

(52) U.S. Cl.
CPC . *H04N 5/2258* (2013.01); *G06T 2207/10024* (2013.01); *G06T 2207/10028* (2013.01); *G06T 2207/10048* (2013.01); *G06T 2207/20221* (2013.01)

(58) Field of Classification Search
CPC .......... G06T 2207/10024; G06T 2207/20021; H04N 5/2258; H04N 5/2256; H04N 5/23203; H04N 5/23229; H04N 5/33; H04N 9/04; G06F 21/53; G06F 21/74; G06K 9/00281; G06K 9/6289; G06K 2009/4666
See application file for complete search history.

(56) References Cited

U.S. PATENT DOCUMENTS

| | | | |
|---|---|---|---|
| 2002/0036599 | A1 | 3/2002 | Nishimura et al. |
| 2015/0035961 | A1* | 2/2015 | Chen ................ H04N 9/04 348/77 |
| 2015/0044995 | A1 | 2/2015 | Chastain et al. |
| 2015/0193651 | A1* | 7/2015 | Gleim ............ G06K 9/00899 382/118 |
| 2015/0256813 | A1* | 9/2015 | Dal Mutto .......... H04N 9/045 348/47 |
| 2017/0039869 | A1* | 2/2017 | Gleim ............. G06K 9/00604 |
| 2018/0173949 | A1* | 6/2018 | Jeong ............. G06K 9/00255 |
| 2018/0368656 | A1* | 12/2018 | Austin .............. A61B 1/00039 |
| 2019/0205517 | A1* | 7/2019 | Moulin .............. G06K 9/66 |
| 2019/0205518 | A1* | 7/2019 | Moulin .............. G06F 21/53 |
| 2019/0313039 | A1* | 10/2019 | Aggarwal ............ H04N 5/04 |

FOREIGN PATENT DOCUMENTS

| | | |
|---|---|---|
| CN | 102122359 A | 7/2011 |
| CN | 102122359 B | 1/2013 |
| CN | 104333686 A | 2/2015 |
| CN | 104504723 A | 4/2015 |
| CN | 105306490 A | 2/2016 |
| CN | 105488679 A | 4/2016 |
| CN | 106548152 A | 3/2017 |
| CN | 104504723 B | 5/2017 |
| CN | 107392055 A | 11/2017 |
| CN | 107808127 A | 3/2018 |
| CN | 107832670 A | 3/2018 |
| CN | 107862266 A | 3/2018 |
| CN | 107924436 A | 4/2018 |
| CN | 108090477 A | 5/2018 |
| CN | 108965716 A | 12/2018 |
| CN | 108986153 A | 12/2018 |
| CN | 109064503 A | 12/2018 |
| DE | 202017103059 U1 | 6/2017 |

OTHER PUBLICATIONS

OA with English translation for CN application 201810867074.3 dated Aug. 30, 2019.
Extended European search report issued in corresponding European application No. 19189270.2 dated Oct. 23, 2019.
English translation for CN OA for CN application 201810867076.2 mailed Apr. 16, 2020.
English translation for CN OA for CN application 201810864801.0 mailed Apr. 14, 2020.

* cited by examiner

METHOD AND DEVICE FOR PROCESSING IMAGE, AND ELECTRONIC DEVICE

CROSS-REFERENCE TO RELATED APPLICATION(S)

This application claims priority to Chinese Patent Application Nos. 201810867074.3, 201810867076.2 and 201810864801.0, all filed on Aug. 1, 2018, the entire contents of all of which are incorporated herein by reference.

TECHNICAL FIELD

The present disclosure relates to a field of computer vision technologies, and more particular to a method and a device for synthesizing data, a storage medium and an electronic device.

BACKGROUND

With development of computer vision technology, image quality of a captured image is becoming higher and higher. In order to improve the image quality, multiple cameras may be arranged on an electronic device to simultaneously capture images.

SUMMARY

Embodiments of the present disclosure provide a method for processing an image, an electronic device and a computer readable storage medium.

The method for processing an image includes: obtaining an image capturing instruction; capturing an infrared image and an RGB (red-green-blue) image based on the image capturing instruction, extracting a first feature of the infrared image and extracting a second feature of the RGB image; and performing an alignment operation based on the first feature and the second feature.

An electronic device, comprising a memory and a processor. The memory has a computer program stored therein. The computer program is executed by the processor, the processor is configured to execute a method for processing an image.

A computer readable storage medium having a computer medium stored therein. When the computer program is executed, a method for processing an image is executed.

BRIEF DESCRIPTION OF DRAWINGS

In order to more clearly illustrate embodiments of the present application or technical solutions of related arts, brief descriptions will be made to drawings in embodiments or related arts below. Obviously, drawings in the following description are merely some embodiments of the present application, and other drawings may be obtained according to the drawings without any creative work for those skilled in the art.

DETAILED DESCRIPTION

In order to make objects, technical solutions, and advantages of the present application more comprehensible, the present application will be further described in detail below with reference to the drawings and embodiments. It should be understood that the specific embodiments described herein are merely used to explain the present application and are not intended to limit the present application.

It may be understood that the terms "first", "second" and the like as used herein, may be used to describe various elements, but these elements are not limited by these terms. These terms are only used to distinguish one element from another. For example, a first client may be referred to as a second client, and similarly, a second client may be referred to as a first client, without departing from the scope of the present application. Both the first client and the second client are clients, but not a same client.

Figure 1:
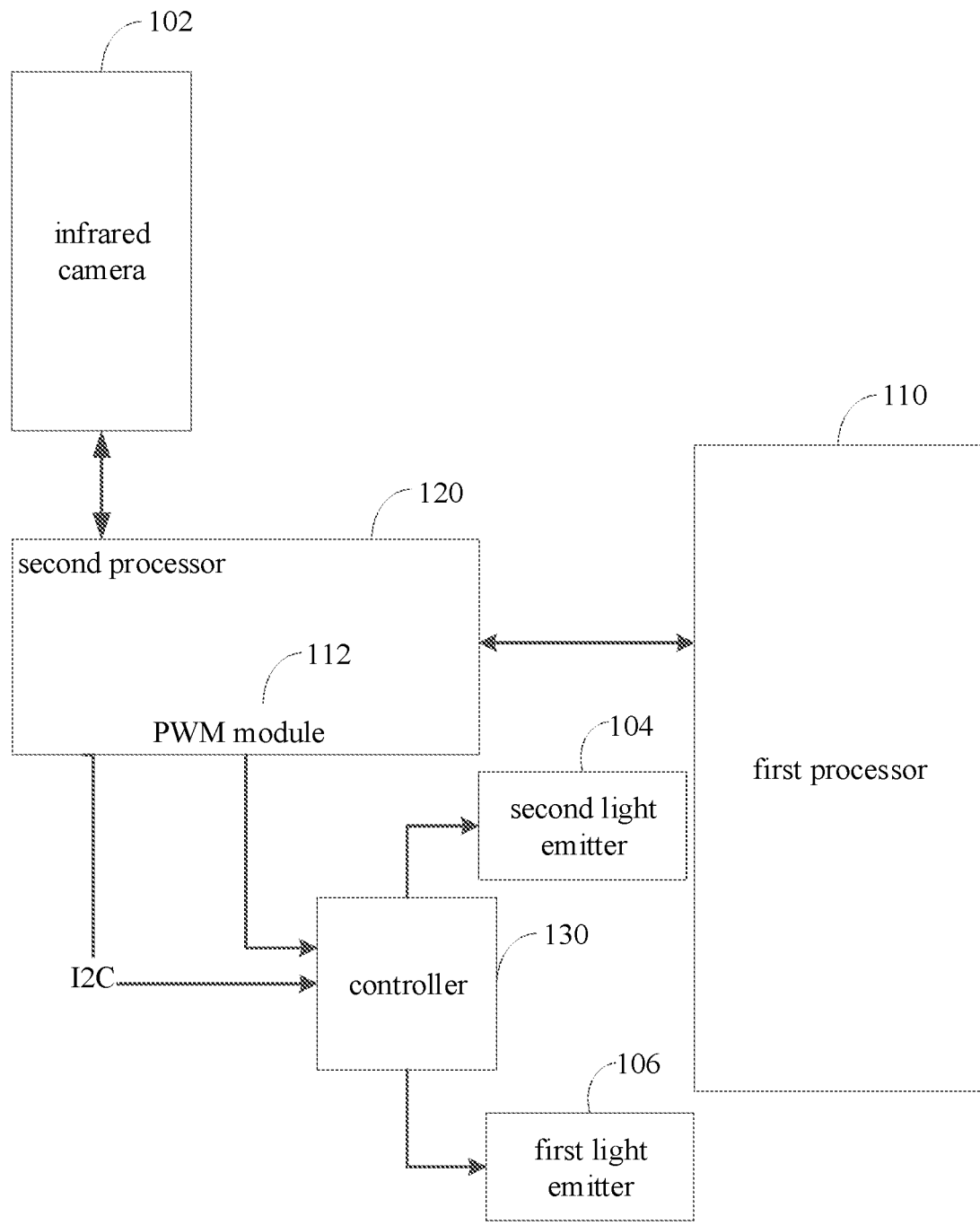
FIG. 1 is a diagram illustrating an application environment where a method for processing an image is applied according to embodiments of the present disclosure.

FIG. 1 is a diagram illustrating an application environment where a method for processing an image is applied according to embodiments of the present disclosure. As illustrated in FIG. 1, an electronic device includes an infrared camera 102, a second light emitter 104, a first light emitter 106, a first processor 110, a second processor 120 and a controller 130. The first processor 110 may be a CPU (central processing unit) module. The second processor 120 may be an MCU (microcontroller unit) module. The second processor 120 may be connected to the infrared camera 102 and the first processor 110. The second processor 120 may be connected to the controller 130 via an I2C (inter-integrated circuit) bus. The second processor 120 may include a PWM (pulse width modulation) module 112, and may be connected to the controller 130 via the PWM module 112. The controller 130 may be connected to the second light emitter 104 and the first light emitter 106.

In an example, the first light emitter 106 may be a laser, and the second light emitter 104 may be a floodlight.

When the second processor 120 receives an image capturing instruction sent by the first processor 110, the second processor 120 may be configured to send a control instruction to the controller 130 via the I2C bus. The control instruction is configured to control to activate at least one of the second light emitter 104 and the first light emitter 106. The second processor 120 may be configured to send a pulse to the controller 130 via the PWM module 112, to turn on at least one of the second light emitter 104 and the first light emitter 106. In addition, a target image may be captured via the infrared camera 102. The second processor 120 may be configured to process the target image and send a processed target image to the first processor 110.

Figure 2:
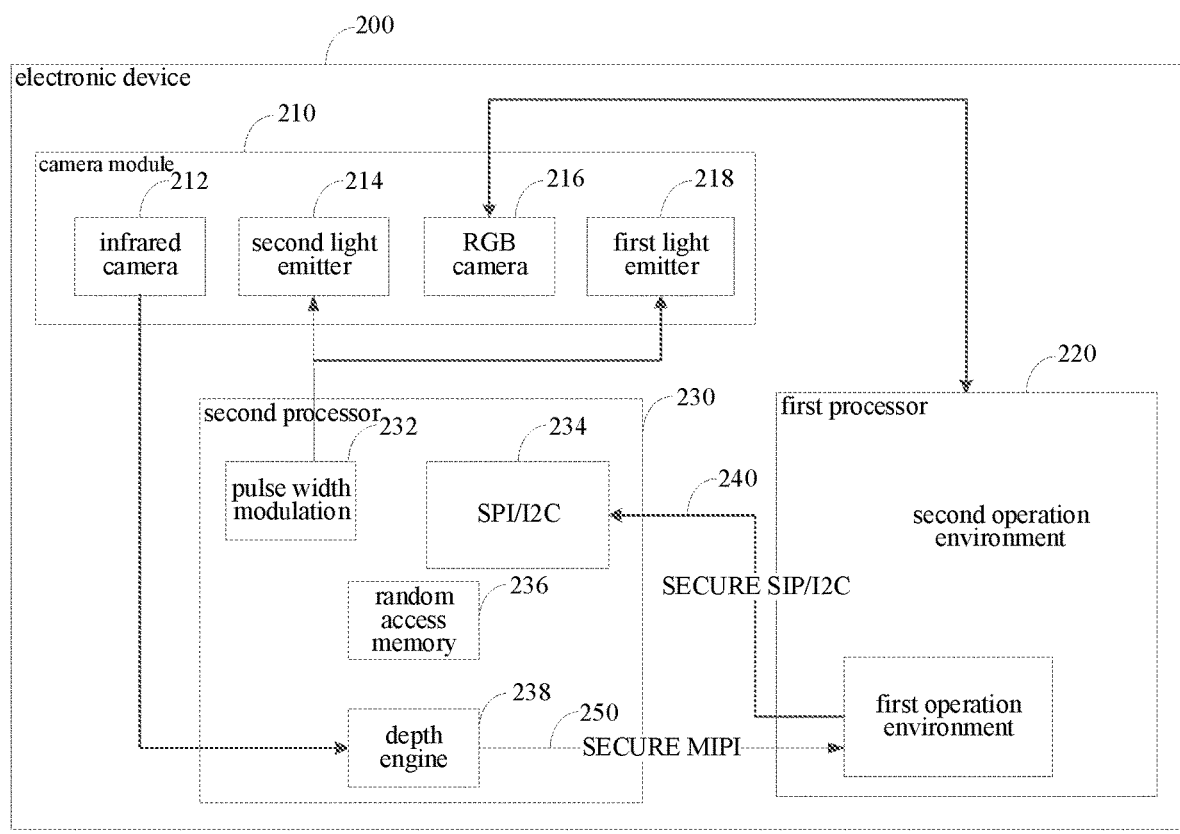
FIG. 2 is a diagram illustrating another application environment where a method for processing an image is applied according to embodiments of the present disclosure

FIG. 2 is a diagram illustrating another application environment where a method for processing an image is applied according to embodiments of the present disclosure. As illustrated in FIG. 2, the electronic device 200 may include a camera module 210, a first processor 220 and a second processor 230. The first processor 220 may be a CPU module. The second processor 230 may be an MCU module. The second processor 230 may be connected between the first processor 220 and the camera module 210. The second processor 230 may be configured to control the infrared camera 212, the second light emitter 241 and the first light emitter 218 in the camera module 210. The first processor 220 may be configured to control an RGB (Red-Green-Blue) camera 216 of the camera module 210.

The camera module 210 may include the infrared camera 212, the second light emitter 214, the RGB camera 216 and the first light emitter 218. The infrared camera 212 may be configured to capture an infrared image. The second light emitter 214 is a surface light source that may emit infrared light. The first light emitter 218 is a point light source that may emit laser light and has a pattern. When the second light emitter 214 is the surface light source, the infrared camera 212 may be configured to capture the infrared image based on reflected light. When the first light emitter 218 is the point light source, the infrared camera 212 may be configured to capture a speckle image based on reflected light. The speckle image may be an image having a deformed pattern compared with the pattern of the laser light emitted by the first light emitter 218, after reflection. The first light emitter 218 may be a laser. The second light emitter 214 may be a floodlight. The floodlight is a surface light source that may emit infrared light. The laser may be a point light source that may emit infrared light and has a pattern. The infrared camera in the camera module may be configured to capture the infrared image based on reflected light of the infrared light emitted by the floodlight, and may capture a speckle image based on reflected light of the infrared light emitted by the laser.

The first processor 220 may include a CPU kernel running in a first execution environment and a CPU kernel running in a second execution environment. The first execution environment may be a TEE (trusted execution environment) environment. The second execution environment may be a REE (rich execution environment) environment. Both the TEE environment and the REE environment may be execution environments of an ARM (advanced RISC machines). A security level of the TEE environment is high, such that only one CPU kernel of the first processor 220 may run in the TEE environment simultaneously. Generally, an operation having a high security level of the electronic device 200 needs to be executed by the CPU kernel in the TEE environment, while an operation having a low security level may be executed by the CPU kernel in the REE environment.

The second processor 230 includes a PWM module 232, a SPI/I2C (serial peripheral interface/inter-integrated circuit) interface 234, a RAM (random access memory) module 236 and a depth engine 238. The second processor 230 may be connected to a controller of the second light emitter 214 and the first light emitter 218 via the PWM module 232. The controller may be connected to the second light emitter 214 and the first light emitter 218, to control the second light emitter 214 and the first light emitter 218. The second processor 230 may be connected to the controller via the I2C bus, and to control to activate the second light emitter 214 or the first light emitter 218 via the connected I2C bus. The above PWM module 232 may be configured to send a pulse to the camera module, to turn on the activated second light emitter 214 or the activated first light emitter 218. The second processor 230 may be configured to capture an infrared image or a speckle image by the infrared camera 212. The SPI/I2C interface 234 may be configured to receive the image capturing instruction sent by the first processor 220. The depth engine 238 may be configured to process the speckle image to obtain a depth disparity map.

When the first processor 220 receives a data obtaining request of an application, for example, when the application needs to perform a face unlock function and a face payment function, the image capturing instruction may be sent to the second processor 230 by the CPU kernel running in the TEE environment. When the image capturing instruction is received by the second processor 230, the second processor 230 may be configured to send the control instruction to the controller via the I2C bus to control to activate the second light emitter 214 of the camera module 210, and to send a pulse wave to the controller via the PWM module 232 to turn on the second light emitter 214, and to control the infrared camera 212 via the I2C bus to capture the infrared image. The second processor 230 may be configured to send the control instruction to the controller via the I2C bus, to control to activate the first light emitter 218 of the camera module 210, and to send a pulse wave to the controller via the PWM module 232 to turn on the first light emitter 218, and to control the infrared camera 212 via the I2C bus to capture the speckle image. The camera module 210 may be configured to send the captured infrared image and the captured speckle image to the second processor 230. The second processor 230 may be configured to process the received infrared image to obtain an infrared disparity map, and to process the received speckle image to obtain a speckle disparity map or a depth disparity map. Processing the infrared image and the speckle image by the second processor 230 means that the infrared image or the speckle image may be corrected, to remove an effect of internal and external parameters of the camera module 210 on images. The second processor 230 may operate in different modes to output different images. When the second processor 230 operates in a speckle image mode, the second processor 230 may be configured to process the speckle image to obtain the speckle disparity map, such that a target speckle image may be obtained based on the speckle disparity image. When the second processor 230 operates in a depth image mode, the second processor 230 may be configured to process the speckle image to obtain a depth disparity map. A depth image may be obtained based on the depth disparity map. The depth image refers to an image having depth information. The second processor 230 may be configured to send the infrared disparity map and the speckle disparity map to the first processor 220. The second processor 230 may be configured to send the infrared disparity map and the depth disparity map to the first processor 220. The first processor 220 may be configured to obtain a target infrared image based on the infrared disparity map, and obtain a depth image based on the depth disparity map. Further, the first processor 220 may be configured to perform face recognition, face matching, living body detection, and acquire depth information of a detected face according to the target infrared image and the depth image.

Communication between the second processor 230 and the first processor 220 may be conducted via a fixed security interface, to ensure security of data transmission. As illustrated in FIG. 2, the first processor 220 may be configured to send data to the second processor 230 via a SECURE SPI/I2C 240. The second processor 230 may be configured to send data to the first processor 220 via a SECURE MIPI (mobile industry processor interface) 250.

In an example, the second processor 230 may be configured to obtain the target infrared image based on the infrared disparity image, to obtain the depth image based on the depth disparity map, and to send the target infrared image and the depth image to the first processor 220.

Figure 3:
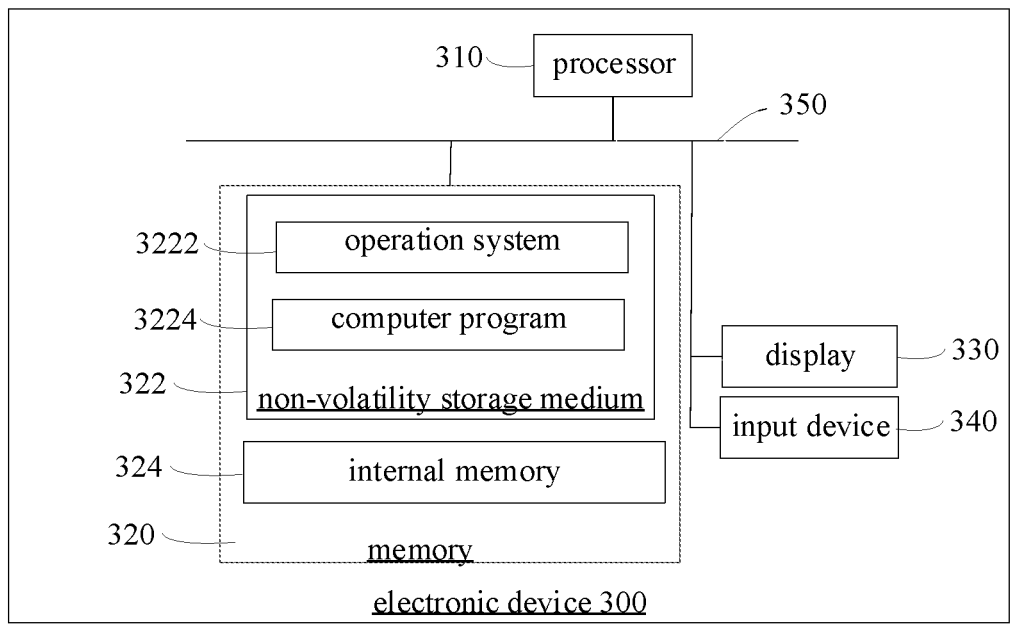
FIG. 3 is a block diagram illustrating an electronic device according to embodiments of the present disclosure.

FIG. 3 is a block diagram illustrating an electronic device according to embodiments of the present disclosure. As illustrated in FIG. 3, the electronic device 300 includes a processor 310, a memory 320, a display 330 and an input device 340 connected via a system bus 350. The memory 320 may include a non-volatility storage medium 332 and an internal memory 324. The non-volatility storage medium 322 of the electronic device 300 is configured to store an operation system 3222 and a computer program 3224. When the computer program 3224 is executed by the processor 310, a method for processing an image according to embodiments of the present disclosure may be executed. The processor 310 is configured to provide a computation function and a control function, serving to support operations of a whole electronic device 300. The internal memory 324 of the electronic device 300 may provide an environment where the computer program 3224 of the non-volatility storage medium 322 is running. The display 330 of the electronic device 300 may be a liquid crystal display or an E-ink display. The input device 340 may be a touchable layer covered on the display 330, or may be a key, a trace ball or a touchable panel arranged on a housing of the electronic device 300, or may be an external keyboard, a touchable panel or a mouse. The electronic device 300 may be a phone, a tablet computer, a personal digital assistance, or a wearable device. It may be understood by those skilled in the art, the structure illustrated as FIG. 3 is merely a block diagram illustrating partial structure related to a technical solution of the present disclosure, but is not construed to limit the electronic device to which the technical solution of the present disclosure is applied. In detail, the electronic device may include less or more components, a combination of some components or different component arrangements illustrated in drawings.

Figure 4:
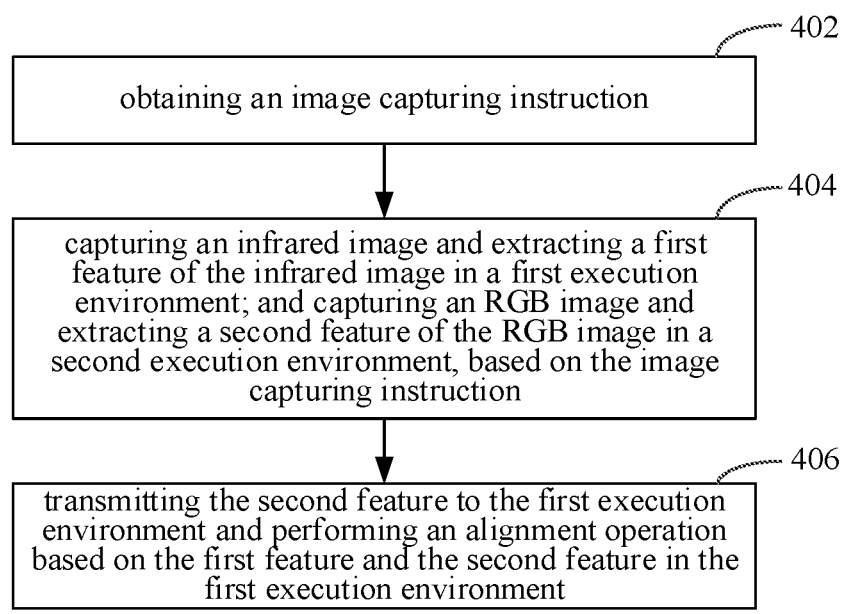
FIG. 4 is a flowchart illustrating a method for processing an image according to embodiments of the present disclosure.

In an example, a method for processing an image applied to the electronic device is provided. As illustrated in FIG. 4, the method includes the following.

At block 402, an image capturing instruction is obtained.

The image capturing instruction may be an instruction for capturing an image. The electronic device may obtain the image capturing instruction through a key or a touchable screen of the electronic device. In detail, a central processing unit of the electronic device may obtain the image capturing instruction.

At block 404, an infrared image may be captured and a first feature of the infrared image may be extracted in a first execution environment, and an RGB image may be captured and a second feature of the RGB image may be extracted in a second execution environment, based on the image capturing instruction.

A security level of the first execution environment is higher than a security level of the second execution environment. The first execution environment may be a TEE (trusted execution environment), while the second execution environment may be a REE (rich execution environment). After the image capturing instruction is acquired by the electronic device, the electronic device may be configured to capture the infrared image in the first execution environment based on the image capturing instruction. The electronic device may be further configured to capture the RGB image in the second execution environment based on the image capturing instruction.

After the infrared image is captured by the electronic device in the first execution environment, the first feature of the infrared image may be extracted in the first execution environment. In detail, the electronic device may be configured to extract the first feature of the infrared image using a SIFT (scale-invariant feature transform) algorithm. The SIFT algorithm is a kind of computer vision algorithm, for detecting and describing local features of the image. Similarly, after the RGB image is captured in the second execution environment, the second feature of the RGB image may be extracted by the electronic device in the second execution environment. The electronic device may be configured to execute the second feature of the RGB image using the SIFT algorithm when the second feature of the RGB image is extracted in the second execution environment.

At block 406, the second feature is transmitted to the first execution environment, and an alignment operation is performed based on the first feature and the second feature in the first execution environment.

The alignment operation is also called as image alignment, to match and superposition two or more images captured by different imaging devices, in different conditions or within different time durations. The electronic device is configured to extract the first feature in the first execution environment, and extract the second feature in the second execution environment. The electronic device may transmit the second feature extracted in the second execution environment to the first execution environment. After the electronic device transmits the second feature to the first execution environment, the first execution environment has the first feature and the second feature, such that the electronic device may be configured to perform the alignment operation based on the first feature and the second feature in the first execution environment.

By obtaining the image capturing instruction, the infrared image may be captured and the first feature of the infrared image may be extracted in the first execution environment, and the RGB image may be captured and the second feature of the RGB image may be extracted in the second execution environment, based on the image capturing instruction. The second feature is transmitted to the first execution environment, and the alignment operation is performed based on the first feature and the second feature in the first execution environment. The security level of the first execution environment is higher than the security level of the second execution environment. By capturing the infrared image and the RGB image in different execution environments and by performing the alignment operation based on the features of images in the second execution environment, security and convenience of aligning images may be improved, and the image quality may be improved.

In an example, after the image capturing instruction is obtained by the electronic device, the infrared image may be captured and the first feature of the infrared image may be extracted in the first execution environment. In addition, the electronic device may be configured to capture the RGB image in the second execution environment, and send the RGB image captured in the second execution environment to the first execution environment. Furthermore, the electronic device may be configured to extract the second feature of the RGB image in the first execution environment, and perform the alignment operation based on the first feature and the second feature in the first execution environment.

In an example, the method for processing an image provided may further include a process of generating a binary file. In an example, the method includes generating the binary file and storing the binary file in the first execution environment.

The electronical device may be configured to perform the alignment operation based on the first feature and the second feature in the first execution environment, to generate the binary file, i.e., bin file. The electronic device may be further configured to store the binary file in the first execution environment.

Figure 5:
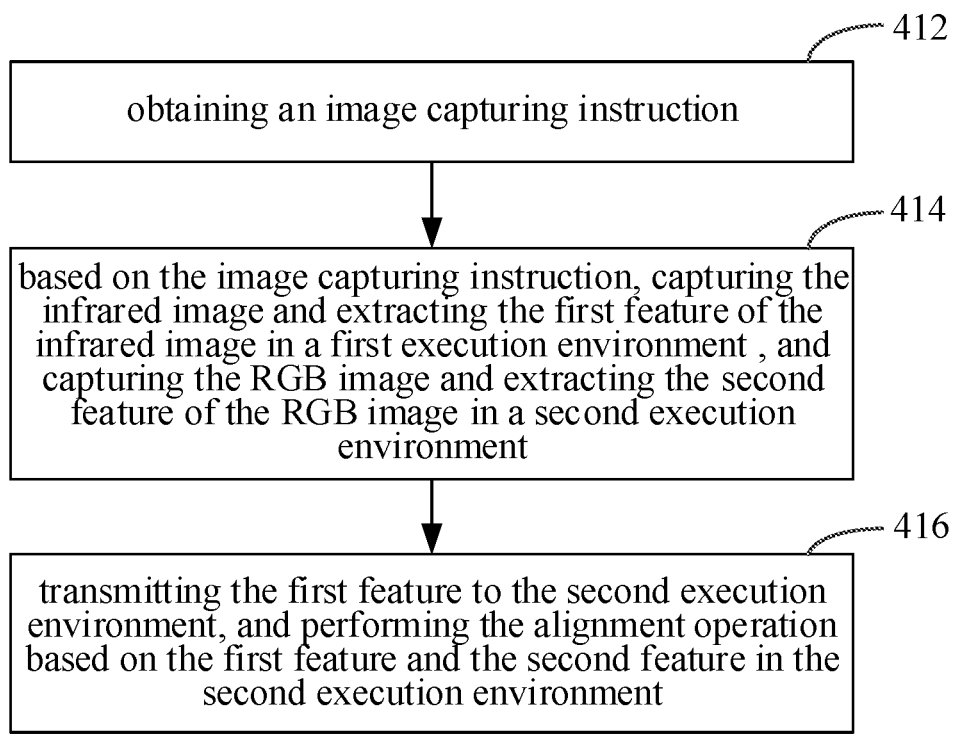
FIG. 5 is a flowchart illustrating a method for processing an image according to embodiments of the present disclosure.

In some examples, the method for processing an image applied to the electronic device is provided. As illustrated in FIG. 5, the method includes the following.

At block 412, an image capturing instruction is obtained.

The image capturing instruction may be an instruction for capturing an image. The electronic device may obtain the image capturing instruction through a key or a touchable screen of the electronic device. In detail, a central processing unit of the electronic device may obtain the image capturing instruction.

At block 414, an infrared image may be captured and a first feature of the infrared image may be extracted in a first execution environment, and an RGB image may be captured and a second feature of the RGB image may be extracted in a second execution environment, based on the image capturing instruction.

A security level of the first execution environment is higher than a security level of the second execution environment. The first execution environment may be a TEE (trusted execution environment), while the second execution environment may be a REE (rich execution environment). After the image capturing instruction is acquired by the electronic device, the electronic device may be configured to capture the infrared image in the first execution environment based on the image capturing instruction. The electronic device may be further configured to capture the RGB image in the second execution environment based on the image capturing instruction.

After the infrared image is captured by the electronic device in the first execution environment, the first feature of the infrared image may be extracted in the first execution environment. In detail, the electronic device may be configured to extract the first feature of the infrared image using a SIFT (scale-invariant feature transform) algorithm. The SIFT algorithm is a kind of computer vision algorithm, for detecting and describing local features of the image. Similarly, after the RGB image is captured in the second execution environment, the second feature of the RGB image may be extracted by the electronic device in the second execution environment. The electronic device may be configured to execute the second feature of the RGB image using the SIFT algorithm when the second feature of the RGB image is extracted in the second execution environment.

At block 416, the first feature is transmitted to the second execution environment, and an alignment operation is performed based on the first feature and the second feature in the second execution environment.

The alignment operation is also called as image alignment, to match and superposition two or more images captured by different imaging devices, in different conditions or within different time durations. The electronic device is configured to extract the first feature in the first execution environment, and extract the second feature in the second execution environment. The electronic device may transmit the first feature extracted in the first execution environment to the second execution environment. After the electronic device transmits the first feature to the second execution environment, the second execution environment has the first feature and the second feature, such that the electronic device may be configured to perform the alignment operation based on the first feature and the second feature in the second execution environment.

By obtaining the image capturing instruction, the infrared image may be captured and the first feature of the infrared image may be extracted in the first execution environment, and the RGB image may be captured and the second feature of the RGB image may be extracted in the second execution environment, based on the image capturing instruction. The first feature is transmitted to the second execution environment, and the alignment operation is performed based on the first feature and the second feature in the second execution environment. The security level of the first execution environment is higher than the security level of the second execution environment. By capturing the infrared image and the RGB image in different execution environments and by performing the alignment operation based on the features of images in the second execution environment, convenience of aligning images may be improved, and the image quality may be improved.

In an example, the method for processing an image provided may further include a process of generating a binary file. In an example, the method includes generating the binary file and storing the binary file in the second execution environment.

The electronical device may be configured to perform the alignment operation based on the first feature and the second feature in the second execution environment, to generate the binary file, i.e., bin file. The electronic device may be further configured to store the binary file in the second execution environment.

Figure 6:
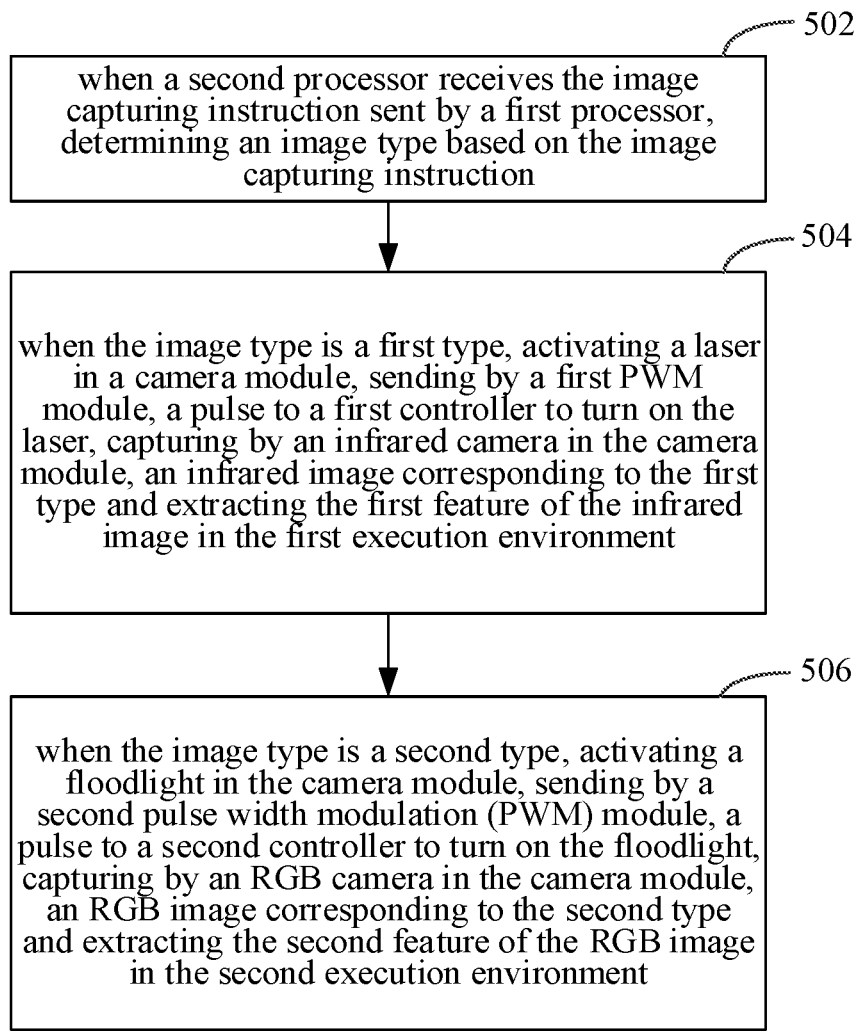
FIG. 6 is a flowchart illustrating a method for capturing an image and extracting a feature of the image based on an image type according to embodiments of the present disclosure.

As illustrated in FIG. 6, in an example, a method for processing an image provided further includes a process of capturing an image and extracting a feature of the image based on an image type. In detail, the method further includes the following.

At block 502, when the second processor receives the image capturing instruction sent by the first processor, an image type may be determined based on the image capturing instruction.

The first processor may be a CPU (central processing unit). The second processor may be an MCU (microcontroller unit). The image may be one or more of an infrared image, a RGB image, a speckle, and a depth image. The second processor is configured to receive the image capturing instruction sent by the first processor, and determine the image type of the captured image based on the image capturing instruction. The image type may be determined based on the image capturing instruction. For example, when the image capturing instruction indicates that a face unlock function is required, the image type may be determined as an infrared type. When the image capturing instruction indicates that face depth information is required, the image type may be determined as a depth type.

At block 504, when the image type is a first type, the first light emitter of the camera module is activated, a pulse is sent to a first controller via a first PWM (pulse width modulation) module to turn on the first light emitter, the infrared image corresponding to the first type is captured by the infrared camera of the camera module and a first feature of the infrared image is extracted in the first execution environment.

When the image type is the first type (the first type is the infrared type), the first processor may be configured to send a control instruction to the first controller. The control instruction may be used to turn on the first light emitter of the camera module. The first processor may be configured to send a pulse signal to the first controller for controlling the first light emitter via a first PWM module, to turn on the first light emitter. In an example, the first PWM module may be configured to turn on the first light emitter based on a pulse signal with a certain voltage amplitude sent to the second light emitter, at a certain time interval. The first light emitter may be a point light source that may illuminate evenly in all directions. When the first light emitter is turned on, infrared light may be emitted, and the infrared image may be captured by the infrared camera. The first light emitter may be a laser. The second light emitter may be a floodlight.

The electronic device may be configured to capture the infrared image by the infrared camera of the camera module in the first capturing environment. The electronic device may be further configured to extract the first image of the infrared image in the first execution environment.

At block 506, when the image type is a second type, the second light emitter of the camera module is activated, a pulse may be sent to a second controller via a second pulse width modulation (PWM) module to turn on the second light emitter, the RGB image corresponding to the second type may be captured by the RGB camera of the camera module and the second feature of the RGB image may be extracted in the second execution environment.

When the image type is the second type (the second type may be an RGB type), the first processor may be configured to send a control instruction to the second controller. The control instruction may be used to activate the second light emitter of the camera module. The first processor may be configured to send a pulse signal to the second controller for controlling the second light emitter via a second PWM module, to turn on the second light emitter. In an example, the second PWM module may be configured to turn on the second light emitter based on a pulse signal with a certain voltage amplitude sent to the first light emitter at a certain time interval. When the second light emitter is turned on, the RGB image may be captured by the RGB camera.

The electronic device may be configured to capture the RGB image by the RGB camera of the camera module in the second execution environment. The electronic device may be further configured to extract the second feature of the RGB image in the second execution environment.

When the second processor receives the image capturing instruction sent by the first processor, the image type may be determined based on the image capturing instruction. When the image type is the first type, the first light emitter may be turned on by the first PWM module and the infrared image corresponding to the first type may be captured by the infrared camera. When the image type is the second type, the second light emitter may be turned on by the second PWM module, and the RGB image corresponding to the second type may be captured by the RGB camera. The second light emitter and the first light emitter may be controlled by the two PWM modules without real-time switching, thereby reducing complexity of data processing and reducing processing workload on the first processor.

Figure 7:
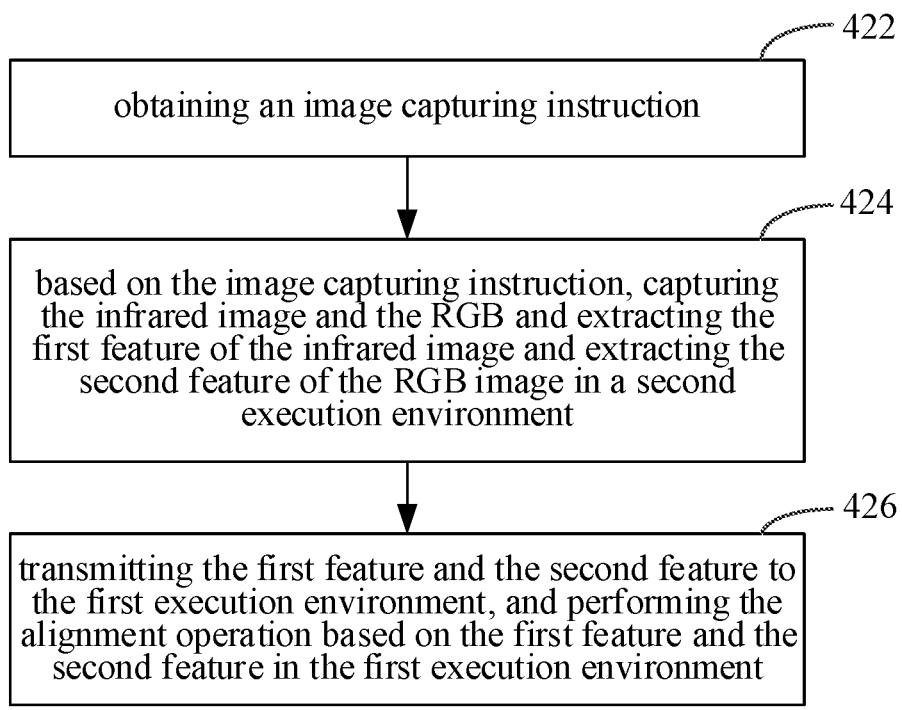
FIG. 7 is a flowchart illustrating a method for processing an image according to embodiments of the present disclosure.

In some example, the method for processing an image applied to the electronic device is provided. As illustrated in FIG. 7, the method includes the following.

At block 422, an image capturing instruction is obtained.

The image capturing instruction may be an instruction for capturing an image. The electronic device may obtain the image capturing instruction through a key or a touchable screen of the electronic device. In detail, a central processing unit of the electronic device may obtain the image capturing instruction.

At block 424, an infrared image and an RGB image may be captured, a first feature of the infrared image may be extracted, and a second feature of the RGB image may be extracted in a second execution environment, based on the image capturing instruction.

A security level of the first execution environment is higher than a security level of the second execution environment. The first execution environment may be a TEE (trusted execution environment), while the second execution environment may be a REE (rich execution environment). After the image capturing instruction is acquired by the electronic device, the electronic device may be configured to capture the infrared image and the RGB image in the second execution environment based on the image capturing instruction.

After the infrared image and the RGB image are captured by the electronic device in the second execution environment, the first feature of the infrared image and the second feature of the RGB image may be extracted in the second execution environment. In detail, the electronic device may be configured to extract the first feature of the infrared image using a SIFT (scale-invariant feature transform) algorithm. The SIFT algorithm is a kind of computer vision algorithm, for detecting and describing local features of the image.

At block 426, the first feature and the second feature are transmitted to the first execution environment, and an alignment operation is performed based on the first feature and the second feature in the first execution environment.

The alignment operation is also called as image alignment, to match and superposition two or more images captured by different imaging devices, in different conditions or within different time durations. The electronic device is configured to extract the first feature and the second feature in the second execution environment, and transmit the first feature and the second feature extracted in the second execution environment to the first execution environment, such that the first execution environment has the first feature and the second feature. The electronic device may be configured to perform the alignment operation based on the first feature and the second feature in the first execution environment.

By obtaining the image capturing instruction, the infrared image and the RGB image may be captured, and the first feature of the infrared image and the second feature of the RGB image may be extracted in the second execution environment, based on the image capturing instruction. The first feature and second feature are transmitted to the first execution environment, and the alignment operation is performed based on the first feature and the second feature in the first execution environment. The security level of the first execution environment is higher than the security level of the second execution environment. By capturing the infrared image and the RGB image in different execution environments and by performing the alignment operation based on the features of images in the first execution environment, security and convenience of aligning images may be improved, and the image quality may be improved.

In an example, after the image capturing instruction is obtained by the electronic device, the infrared image and the RGB image may be captured in the second execution environment. Furthermore, the electronic device is configured to transmit the first feature and the second feature to the first execution environment. In addition, the electronic device is configured to perform the alignment operation based on the first feature and the second feature in the first execution environment.

Figure 8:
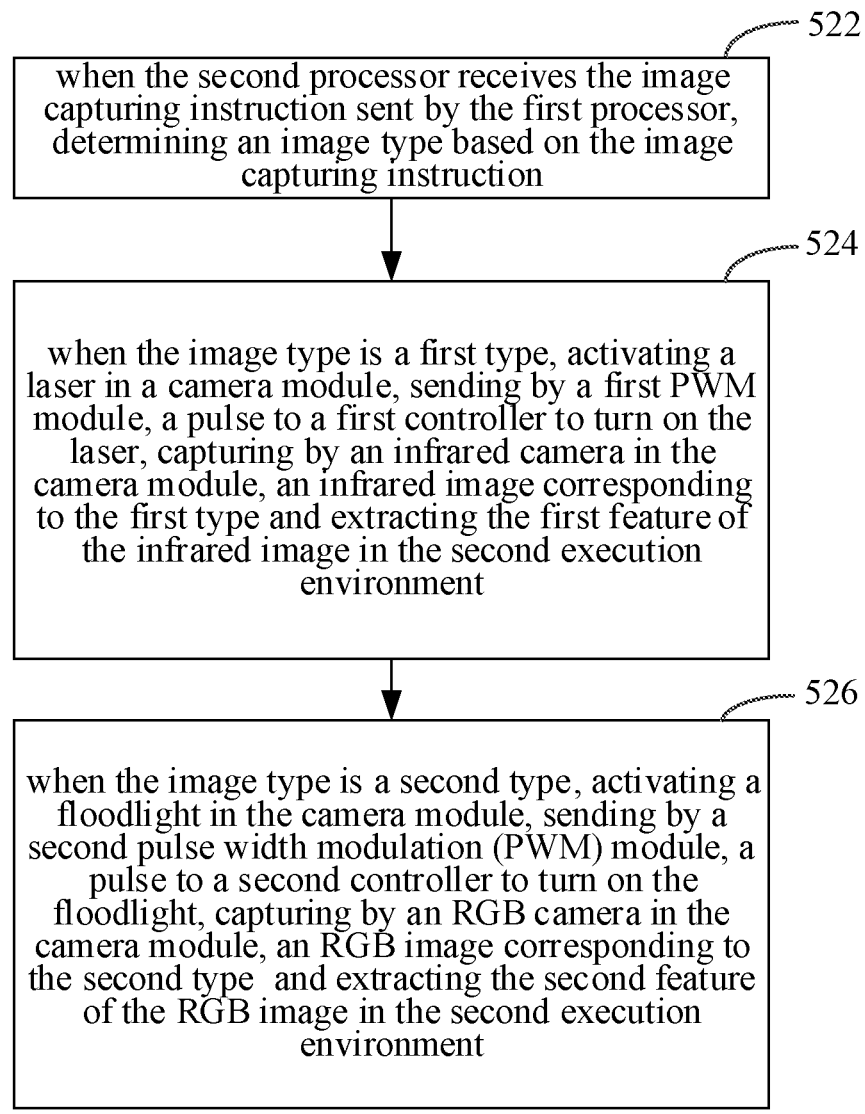
FIG. 8 is a flowchart illustrating a method for capturing an image and extracting a feature of the image based on an image type according to embodiments of the present disclosure.

As illustrated in FIG. 8, in an example, the method for processing an image provided further includes a process of capturing an image and extracting a feature of the image based on an image type. In detail, the method further includes the following.

At block 522, when the second processor receives the image capturing instruction sent by the first processor, an image type may be determined based on the image capturing instruction.

The first processor may be a CPU (central processing unit). The second processor may be an MCU (microcontroller unit). The image may be one or more of an infrared image, a RGB image, a speckle, and a depth image.

The second processor is configured to receive the image capturing instruction sent by the first processor, and determine the image type of the captured image based on the image capturing instruction. The image type may be determined based on the image capturing instruction. For example, when the image capturing instruction indicates that a face unlock function is required, the image type may be determined as an infrared type. When the image capturing instruction indicates that face depth information is required, the image type may be determined as a depth type.

At block 524, when the image type is a first type, the first light emitter of the camera module is activated, a pulse is sent to a first controller via a first PWM (pulse width modulation) module to turn on the first light emitter, the infrared image corresponding to the first type is captured by the infrared camera of the camera module and a first feature of the infrared image is extracted in the second execution environment.

When the image type is the first type (the first type is the infrared type), the first processor may be configured to send a control instruction to the first controller. The control instruction may be used to turn on the first light emitter of the camera module. The first processor may be configured to send a pulse signal to the first controller for controlling the first light emitter via a first PWM module, to turn on the first light emitter. In an example, the first PWM module may be configured to turn on the first light emitter based on a pulse signal with a certain voltage amplitude sent to the second light emitter, at a certain time interval. The first light emitter may be a point light source that may illuminate evenly in all directions. When the first light emitter is turned on, infrared light may be emitted, and the infrared image may be captured by the infrared camera. The first light emitter may be a laser. The second light emitter may be a floodlight.

The electronic device may be configured to capture the infrared image by the infrared camera of the camera module in the second capturing environment. The electronic device may be further configured to extract the first image of the infrared image in the second execution environment.

At block 526, when the image type is a second type, the second light emitter of the camera module is activated, a pulse may be sent to a second controller via a second pulse width modulation (PWM) module to turn on the second light emitter, the RGB image corresponding to the second type may be captured by the RGB camera of the camera module and the second feature of the RGB image may be extracted in the second execution environment.

When the image type is the second type (the second type may be an RGB type), the first processor may be configured to send a control instruction to the second controller. The control instruction may be used to activate the second light emitter of the camera module. The first processor may be configured to send a pulse signal to the second controller for controlling the second light emitter via a second PWM module, to turn on the second light emitter. In an example, the second PWM module may be configured to turn on the second light emitter based on a pulse signal with a certain voltage amplitude sent to the first light emitter at a certain time interval. When the second light emitter is turned on, the RGB image may be captured by the RGB camera.

The electronic device may be configured to capture the RGB image by the RGB camera of the camera module in the second execution environment. The electronic device may be further configured to extract the second feature of the RGB image in the second execution environment.

When the second processor receives the image capturing instruction sent by the first processor, the image type may be determined based on the image capturing instruction. When the image type is the first type, the first light emitter may be turned on by the first PWM module and the infrared image corresponding to the first type may be captured by the infrared camera. When the image type is the second type, the second light emitter may be turned on by the second PWM module, and the RGB image corresponding to the second type may be captured by the RGB camera. The second light emitter and the first light emitter may be controlled by the two PWM modules without real-time switching, thereby reducing complexity of data processing and reducing processing workload on the first processor.

In some examples, the method for processing an image provided may further include a process of generating a binary file. In an example, the method includes generating the binary file and storing the binary file in the first execution environment.

The electronical device may be configured to perform the alignment operation based on the first feature and the second feature in the first execution environment, to generate the binary file, i.e., bin file. The electronic device may be further configured to store the binary file in the first execution environment.

In an example, the first processor may be connected to the second light emitter and the first light emitter via an inter-integrated circuit (I2C) bus. The method for processing an image provided may further include: when it is detected that the camera module is activated, configuring, by the first processor, the second light emitter and the first light emitter via the I2C bus.

When the electronic device needs to collect image data by the camera module, the camera module may be activated, and an image may be captured by the camera module. When it is detected by the electronic device, that the camera module is activated, the first processor may be configured to configure the second light emitter and the first light emitter via the I2C bus. The I2C bus may be used to transmit data among various components connected to the I2C bus through a data line and a clock line. The first processor may be configured to read a configuration file, and to configure the second light emitter and the first light emitter based on parameters contained in the configuration file. The configuration file may have parameters, such as emission power and emission current, of the second light emitter and the first light emitter recorded therein, and the configuration file is not limited thereto. The configuration file may include other parameters. The first processor may be configured to configure the emission power and the emission current of the second light emitter and the first light emitter based on parameters of the configuration file.

In an example, the first processor may be connected to the second light emitter and the first light emitter through two I2C buses. The first processor may be connected to the second light emitter through an I2C bus, and connected to the first light emitter through another I2C bus. When the first processor configures the second light emitter and the first light emitter, the second light emitter may be addressed by the first processor through the I2C bus connected to the second light emitter, and the first processor is configured to configure the second light emitter. In addition, the first processor may address the first light emitter through the I2C bus connected to the first light emitter, and configure the first light emitter. The first processor may be connected to the second light emitter and the first light emitter through the two I2C buses respectively, such that the second light emitter and the first light emitter may be configured in parallel, to improve data processing speed.

In an example, the first processor may be connected to the second light emitter and the first light emitter through a same I2C bus. The second light emitter, the first light emitter and the first processor may be connected to the same I2C bus. When the first processor configures the second light emitter and the first light emitter, the second light emitter may be addressed firstly through the I2C bus, and the second light emitter may be configured. The first light emitter may be addressed through the I2C bus, and the first light emitter may be configured. In an example, the first processor may be configured to address the first light emitter through the I2C bus firstly, and to configure the first light emitter. The second light emitter may be addressed through the I2C bus, and the second light emitter may be configured. By multiplexing the same I2C bus, the complexity of the control circuit may be reduced, thereby saving resources and reducing cost.

Figure 9:
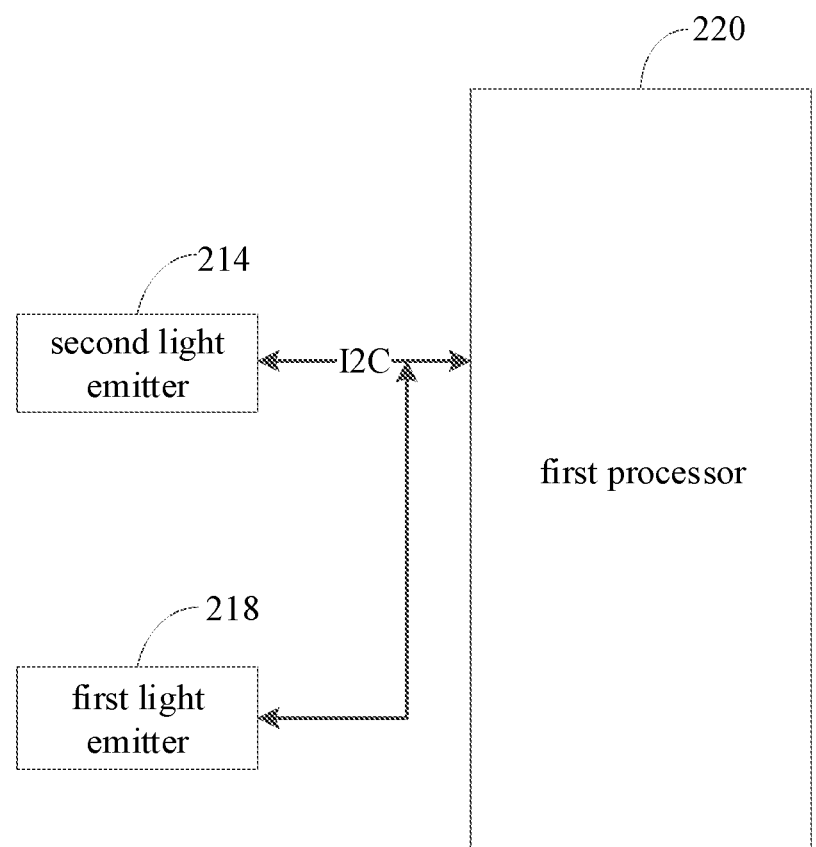
FIG. 9 is a schematic diagram illustrating that a first processor is connected to a second light emitter and a first light emitter via an I2C (inter-integrated circuit) bus according to embodiments of the present disclosure.

FIG. 9 is a diagram illustrating that the first processor is connected to the second light emitter and the first light emitter through the I2C bus according to embodiments of the present disclosure. As illustrated in FIG. 9, the first processor 220 may be connected to the second light emitter 214 and the first light emitter 218 through the same I2C bus.

Figure 10:
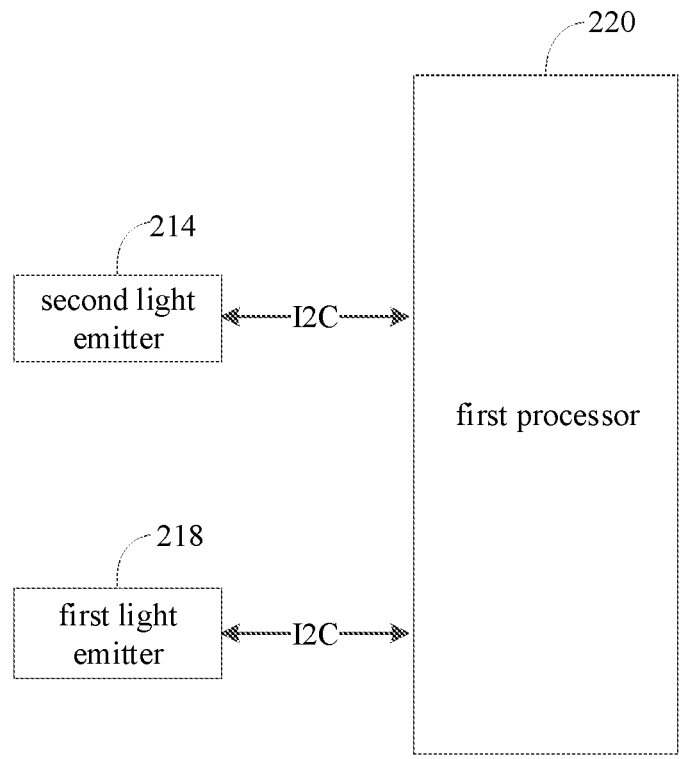
FIG. 10 is another schematic diagram illustrating that a first processor is connected to a second light emitter and a first light emitter via an I2C bus according to embodiments of the present disclosure.

FIG. 10 is another diagram illustrating that the first processor is connected to the second light emitter and the first light emitter through the I2C bus according to embodiments of the present disclosure. As illustrated in FIG. 10, the first processor 220 may be connected to the second light emitter 214 and the first light emitter 218 through two I2C buses. The first processor may be connected to the second light emitter 214 through one I2C bus, and connected to the first light emitter 218 through another I2C bus.

In an example, when the camera module is activated, the first processor may be configured to configure the second light emitter and the first light emitter through the I2C bus. Therefore, image capturing may be controlled accurately, and efficiency of data processing may be improved.

In an example, in a method for processing an image provided, a time point when the first PWM module sends the pulse to the first controller is different from a time point when the second PWM module sends the pulse to the second controller. A time duration between the time point when the pulse is sent to the first controller and the time point when the pulse is sent to the second controller is less than a time threshold.

The second processor is configured to determine the image type based on the image capturing instruction. The image type may include at least two types. For example, the image type may include a first type and a second type. When the image type includes an infrared type and an RGB type, it is required to simultaneously capture an infrared image and an RGB image. The second processor may be configured to send a pulse to the first controller through the first PWM module and send a pulse to the second controller through the second PWM module simultaneously, to turn on the second light emitter and the first light emitter. The time point when the first PWM module sends the pulse to the first controller may be different from the time point when the second PWM module sends the pulse to the second controller, such that the second light emitter and the first light emitter may be turned on at different time points. The second processor may be configured to capture the infrared image via the infrared camera at the time point when the first PWM module sends the pulse to the first controller, and capture the RGB image via the RGB camera at the time point when the second PWM module sends the pulse to the second controller.

A time duration between the time point when the first PWM module sends the pulse to the first controller and the time position when the second PWM module sends the pulse to the second controller is smaller than the time threshold. The RGB image may be captured within the time threshold after the infrared image is captured by the infrared camera, such that content of the infrared image and content of the RGB image are relatively consistent, thereby facilitating subsequent alignment operations and the like. The time threshold may be set according to actual requirements, such as 20 milliseconds, 30 milliseconds and the like.

The second processor may be configured to capture the infrared image by the infrared camera and capture the RGB image by the RGB camera at different time points, such that the content of the infrared image and the content of the RGB image may be consistent, thereby improving accuracy of subsequent face detection.

In an example, the method for processing an image may executed by an electronic device.

The electronic device may be configured to obtain an image capturing instruction. The image capturing instruction may be an instruction for capturing an image. The electronic device may obtain the image capturing instruction through a key or a touchable screen of the electronic device. In detail, a central processing unit of the electronic device may obtain the image capturing instruction.

The electronic device may be configured to capture an infrared image and extract a first feature of the infrared image in a first execution environment, and configured to capture an RGB image and extract a second feature of the RGB image in a second execution environment, based on the image capturing instruction. The first processor is connected to a second light emitter and a first light emitter through an I2C (inter-integrated circuit) bus. When it is determined by the electronic device that a camera module is activated, the first processor is configured to configure the second light emitter and the first light emitter through the I2C bus.

The first processor may be connected to the second light emitter and the first light emitter through two I2C buses. The first processor may be connected to the second light emitter through one I2C bus, and connected to the first light emitter through anther I2C bus. The first processor may be connected to the second light emitter and the first light emitter through a same I2C bus. The second light emitter, the first light emitter and the first processor may be connected to a same I2C bus.

When the image capturing instruction sent by the first processor is received by the second processor, the electronic device may be configured to determine an image type based on the image capturing instruction. When the image type is a first type, the electronic device may be configured to activate the first light emitter of the camera module and send a pulse to a first controller by a first PWM (pulse width modulation) module to turn on the first light emitter. In addition, the electronic device is configured to capture an infrared image corresponding to the first type by an infrared camera of the camera module and extract a first feature of the infrared image in the first execution environment. When the image type is a second type, the electronic device may be configured to activate the second light emitter of the camera module and send a pulse to the second controller by a second pulse width modulation (PWM) module to turn on the second light emitter. In addition, the electronic device is configured to capture the RGB image corresponding to the second type by the RGB camera of the camera module, and extract the second feature of the RGB image in the second execution environment. A time point when the first PWM module sends the pulse to the first controller is different from the time point when the second PWM module sends the pulse to the second controller. A time duration between the time point when the pulse is sent to the first controller and the time point when the pulse is sent to the second controller is less than a time threshold.

In some examples, the electronic device may be configured to send the second feature to the first execution environment and perform an alignment operation based on the first feature and the second feature in the first execution environment. The alignment operation is also called as image alignment, to match and superposition two or more images captured by different imaging devices, in different conditions or within different time durations. The electronic device is configured to extract the first feature in the first execution environment, and extract the second feature in the second execution environment. The electronic device may transmit the second feature extracted in the second execution environment to the first execution environment. After the electronic device transmits the second feature to the first execution environment, the first execution environment has the first feature and the second feature, such that the electronic device is configured to perform the alignment operation based on the first feature and the second feature in the first execution environment.

The electronic device is further configured to generate a binary file and store the binary file in the first execution environment. After the alignment operation is performed based on the first feature and the second feature by the electronic device in the first execution environment, the binary file may be generated, such as bin file. The electronic device may be further configured to store the generated binary file in the first execution environment.

In some examples, the electronic device may be configured to send the first feature to the second execution environment and perform an alignment operation based on the first feature and the second feature in the second execution environment. The electronic device is configured to extract the first feature in the first execution environment, and extract the second feature in the second execution environment. The electronic device may transmit the first feature extracted in the first execution environment to the second execution environment. After the electronic device transmits the first feature to the second execution environment, the second execution environment has the first feature and the second feature, such that the electronic device is configured to perform the alignment operation based on the first feature and the second feature in the second execution environment.

The electronic device is further configured to generate a binary file and store the binary file in the second execution environment. After the alignment operation is performed based on the first feature and the second feature by the electronic device in the second execution environment, the binary file may be generated, such as bin file. The electronic device may be further configured to store the generated binary file in the second execution environment.

In some example, the electronic device may be configured to capture the infrared image and the RGB image and extract a first feature of the infrared image and the second feature of the RGB image in a second execution environment, based on the image capturing instruction.

When the image capturing instruction sent by the first processor is received by the second processor, the electronic device may be configured to determine an image type based on the image capturing instruction. When the image type is a first type, the electronic device may be configured to activate the first light emitter of the camera module and send a pulse to a first controller by a first PWM (pulse width modulation) module to turn on the first light emitter. In addition, the electronic device is configured to capture an infrared image corresponding to the first type by an infrared camera of the camera module and extract a first feature of the infrared image in the second execution environment. When the image type is a second type, the electronic device may be configured to activate the second light emitter of the camera module and send a pulse to the second controller by a second pulse width modulation (PWM) module to turn on the second light emitter. In addition, the electronic device is configured to capture the RGB image corresponding to the second type by the RGB camera of the camera module, and extract the second feature of the RGB image in the second execution environment.

The electronic device may be configured to send the first feature and the second feature to the first execution environment and perform an alignment operation based on the first feature and the second feature in the first execution environment. The electronic device is configured to extract the first feature and the second feature in the second execution environment. The electronic device may transmit the first feature and the second feature extracted in the second execution environment to the first execution environment. After the electronic device transmits the first feature and the second feature to the first execution environment, the first execution environment has the first feature and the second feature, such that the electronic device is configured to perform the alignment operation based on the first feature and the second feature in the first execution environment.

The electronic device is further configured to generate a binary file and store the binary file in the first execution environment. After the alignment operation is performed based on the first feature and the second feature by the electronic device in the first execution environment, the binary file may be generated, such as bin file. The electronic device may be further configured to store the generated binary file in the first execution environment.

It should be understood that, although various blocks in the above-described flowcharts are sequentially displayed according to directions of arrows, these blocks are not necessarily performed in the order indicated by the arrows. Unless explicitly described herein, executions of these blocks are not strictly limited, and these blocks may be performed in other orders. Moreover, at least some of blocks in the above flowchart may include a plurality of sub blocks or stages, which are not necessarily performed at same time, but may be executed at different time. The sub blocks and stages may be executed alternatively or subsequently to other blocks, or sub blocks or stages.

In an example, an electronic device is provided. The electronic device includes a camera module, a first processor and a second processor. The second processor is connected to the first processor and the camera module. The camera module includes a laser camera, a second light emitter and a first light emitter. The second light emitter is connected to the first controller. The first light emitter is connected to the second controller. The second processor includes a first PWM module and a second PWM module. The second processor is connected to the first controller through the first PWM module. The second processor is connected to the second controller through the second PWM module.

The first processor is configured to obtain an image capturing instruction, to capture an infrared image and extract a first feature of the infrared image in the first execution environment and capture an RGB image and extract a second feature of the RGB image in a second execution environment, based on the image capturing instruction. In addition, the first processor is configured to transmit the second feature to the first execution environment and perform an alignment operation based on the first feature and the second feature in the first execution environment.

In some examples, the first processor is configured to obtain an image capturing instruction, to capture an infrared image and extract a first feature of the infrared image in the first execution environment and capture an RGB image and extract a second feature of the RGB image in a second execution environment, based on the image capturing instruction. In addition, the first processor is configured to transmit the first feature to the second execution environment and perform an alignment operation based on the first feature and the second feature in the second execution environment.

In some examples, the first processor is configured to obtain an image capturing instruction, to capture an infrared image and an RGB image, and extract a first feature of the infrared image and extract a second feature of the RGB image in the second execution environment, based on the image capturing instruction. In addition, the first processor is configured to transmit the first feature and the second feature to the first execution environment and perform an alignment operation based on the first feature and the second feature in the first execution environment.

The second processor is configured to determine an image type based on the image capturing instruction when the image capturing instruction sent by the first processor is received. When the image type is a first type, a first light emitter of the camera module is activated, and a pulse is sent to the first controller through a first pulse width modulation (PWM) module, to turn on the first light emitter, Further, the second processor is configured to capture the infrared image corresponding to the first type by the infrared camera of the camera module. When the image type is a second type, the second processor is configured to activate the second light emitter of the camera module, and send a pulse to the second controller through the second PWM module to turn on the second light emitter. Further, the second processor is configured to capture the RGB image corresponding to the second type by the RGB camera of the camera module.

In an example, when the second processor receives the image capturing instruction sent by the first processor, the image type may be determined based on the image capturing instruction. When the image type is the first type, the first light emitter may be turned on through the first PWM module, and the infrared image corresponding to the first type may be captured by the infrared camera. When the image type is the second type, the second light emitter may be turned on through the second PWM module and the RGB image corresponding to the second type may be captured by the RGB camera. The second light emitter and the first light emitter may be controlled through two PWM modules without real-time switching, thereby reducing complexity of data processing and reducing processing workload on the first processor.

In an example, the first processor is connected to the second light emitter and the first light emitter through an inter-integrated circuit (I2C) bus. The first processor is configured to configure the second light emitter and the first light emitter through the I2C bus when it is detected that the camera module is activated.

In an example, the first processor is connected to the second light emitter and the first light emitter through a same I2C bus.

In an example, the first processor is connected to the second light emitter through one I2C circuit, and connected to the first light emitter through another I2C circuit.

In an example, the first processor is configured to configure the second light emitter and the first light emitter through the I2C bus when the camera module is activated. Therefore, image capturing may be controlled accurately, and efficiency of data processing may be improved.

In an example, a time point when the first PWM module sends the pulse to the first controller is different from a time point when the second PWM module sends the pulse to the second controller. A time duration between the time point when the pulse is sent to the first controller and a time point when the pulse is sent to the second controller is less than a time threshold.

In an example, the second processor may be configured to capture the infrared image by the infrared camera and the RGB image by the RGB image at different time points. Therefore, content of the infrared image is consistent to content of the RGB image, thereby improving accuracy of subsequent face detection.

Figure 11:
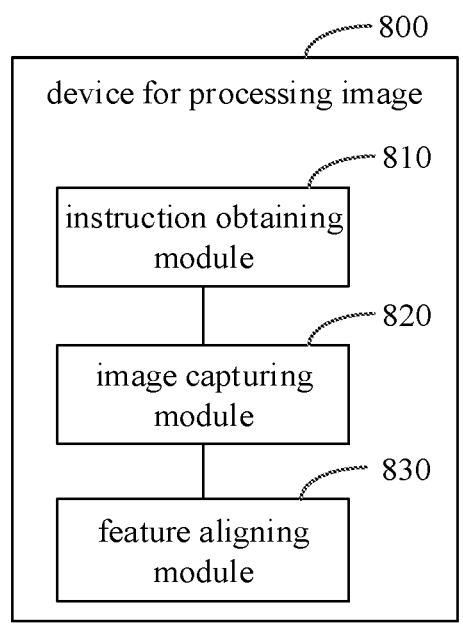
FIG. 11 is a block diagram illustrating a device for processing an image according to embodiments of the present disclosure.

As illustrated in FIG. 11, a device 800 for processing an image is provided. The device 800 may include an instruction obtaining module 810, an image capturing module 820 and a feature aligning module 830.

In some examples, the instruction obtaining module 810 is configured to obtain an image capturing instruction. The image capturing module 820 is configured to capture an infrared image and extract a first feature of the infrared image in a first execution environment, and capture an RGB image and extract a second feature of the RGB image in a second execution environment, based on the image capturing instruction. The feature aligning module 830 is configured to transmit the second feature to the first execution environment, and perform an alignment operation based on the first feature and the second feature in the first execution environment. In some examples, the feature aligning module 830 is configured to generate a binary file and store the binary file in the first execution environment.

In some examples, the instruction obtaining module 810 is configured to obtain an image capturing instruction. The image capturing module 820 is configured to capture an infrared image and extract a first feature of the infrared image in a first execution environment, and capture an RGB image and extract a second feature of the RGB image in a second execution environment, based on the image capturing instruction. The feature aligning module 830 is configured to transmit the first feature to the second execution environment, and perform an alignment operation based on the first feature and the second feature in the second execution environment. In some examples, the feature aligning module 830 is configured to generate a binary file and store the binary file in the second execution environment.

A security level of the first execution environment is higher than a security level of the second execution environment.

In an example, the image capturing module 820 may include an image type determining unit, a first feature extracting unit and a second feature extracting unit.

The image type determining unit is configured to determine an image type based on the image capturing instruction when the second processor receives the image capturing instruction sent by the first processor.

The first feature extracting unit is configured to activate the first light emitter of the camera module, send a pulse to the first controller through the first PWM module to turn on the first light emitter, capture an infrared image corresponding to the first type by the infrared camera of the camera module and execute the first feature of the infrared image in the first execution environment, when the image type is a first type.

The second feature extracting module is configured to activate a second light emitter of the camera module, send a pulse to the second controller by the second pulse width module (PWM) module to turn on the second light emitter, capture an RGB image corresponding to the second type by the RGB camera of the camera module and extract a second feature of the RGB image in the second execution environment, when the image type is a second type.

In an example, the instruction obtaining module 810 is configured to obtain an image capturing instruction. The image capturing module 820 is configured to capture an infrared image and an RGB image and extract a first feature of the infrared image and a second feature of the RGB image in a second execution environment, based on the image capturing instruction. The feature aligning module 830 is configured to transmit the first feature second feature to the first execution environment, and perform an alignment operation based on the first feature and the second feature in the first execution environment. In some examples, the feature aligning module 830 is configured to generate a binary file and store the binary file in the first execution environment.

A security level of the first execution environment is higher than a security level of the second execution environment.

In an example, the image capturing module 820 may include an image type determining unit, a first feature extracting unit and a second feature extracting unit.

The image type determining unit is configured to determine an image type based on the image capturing instruction when the second processor receives the image capturing instruction sent by the first processor.

The first feature extracting unit is configured to activate the first light emitter of the camera module, send a pulse to the first controller through the first PWM module to turn on the first light emitter, capture an infrared image corresponding to the first type by the infrared camera of the camera module and execute the first feature of the infrared image in the second execution environment, when the image type is a first type.

The second feature extracting module is configured to activate a second light emitter of the camera module, send a pulse to the second controller by the second pulse width module (PWM) module to turn on the second light emitter, capture an RGB image corresponding to the second type by the RGB camera of the camera module and extract a second feature of the RGB image in the second execution environment, when the image type is a second type.

In an example, the first processor is connected to the second light emitter and the first light emitter through an inter-integrated circuit (I2C) bus. When it is detected that the camera module is activated, the first processor is configured to configure the second light emitter and the first light emitter through the I2C bus. In an example, the first processor is connected to the second light emitter through one I2C and connected to the first light emitter through another I2C bus. In an example, the first processor is connected to the second light emitter and the first light emitter through a same I2C circuit. In an example, a time point when the first PWM module sends the pulse the first controller is different from a time point when the second PWM module sends the pulse to the second controller. A time duration between the time point when the pulse is sent to the first controller and the time point when the pulse is sent to the second controller is less than a time threshold.

In the above examples, division of each module in the device for processing an image is only used for illustration. In other embodiments, the device for processing an image can be divided into different modules according to requirements, to realize all or part of functions of the device for processing an image. For specific limitations of the device for processing an image may refer to limitations of the method for processing an image corresponding thereto, which is not be repeated herein. Each module of the device for processing an image may be realized wholly or partially by software, hardware and a combination thereof. The above modules can be embedded in or independent of a processor in a computer device in hardware form, or stored in a memory in the computer device in software form, so that the processor can call and perform corresponding operations of the above modules.

Implementations of each module in the device for processing an image provided in embodiments of the present application may be in a form of computer program. The computer program may run on a terminal or server. Program modules composed of the computer program can be stored in the memory of the terminal or server. When the computer program is executed by the processor, blocks of the method described in embodiments of the present application are executed.

Embodiments of the present application also provide a computer readable storage medium, such as one or more non-volatile computer-readable storage media having computer executable instructions stored therein. When the computer executable instructions are executed by the one or more processors, blocks of the method for processing an image illustrated in the above embodiments may be executed.

A computer program product containing instructions is provided. When the instructions are running on a computer, the computer is caused to execute the method for processing an image provided in the above embodiments.

Any reference to memory, storage, database or other media used in the present application may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include A random access memory (RAM), which is used as an external cache memory. The RAM is available in many forms, such as a statistic RAM (SRAM), a dynamic RAM (DRAM), a synchronic DRAM (SDRAM), a dual data ratio SDRAM (DDR SDRAM), an enhanced SDRAM (ES-DRAM), a synchlink DRAM (SLDRAM), a rambus direct RAM (RDRAM), a direct RDRAM (DRDRAM), and a rambus dynamic RAM (RDRAM).

The above-mentioned embodiments only express several embodiments of the present application, descriptions of which are specific and detailed, but cannot therefore be construed as limitations on the scope of the patent application. It should be pointed out that for those skilled in the art, some modifications and improvements made without departing from the concept of the present application, belong to the protective scope of the present application. Therefore, the protective scope of the present application shall be governed by the appended claims.

What is claimed is:

1. A method for processing an image, comprising:
   obtaining an image capturing instruction;
   based on the image capturing instruction, capturing an infrared image and extracting a first feature of the infrared image in a trusted execution environment, capturing an RGB image and extracting a second feature of the RGB image in a rich execution environment; or capturing the infrared image and the RGB image and extracting the first feature of the infrared image and extracting the second feature of the RGB image in the rich execution environment; and
   performing an alignment operation based on the first feature and the second feature.

2. The method of claim 1, further comprising:
   in response to capturing the infrared image and extracting the first feature of the infrared image in the trusted execution environment, and capturing the RGB image and extracting the second feature of the RGB image in the rich execution environment, transmitting the second feature to the trusted execution environment, and performing the alignment operation based on the first feature and the second feature in the trusted execution environment, or transmitting the first feature to the rich execution environment and performing the alignment operation based on the first feature and the second feature in the rich execution environment; and
   in response to capturing the infrared image and the RGB image and extracting the first feature of the infrared image and extracting the second feature of the RGB image in the rich execution environment, transmitting the first feature and the second feature to the trusted execution environment, and performing the alignment operation based on the first feature and the second feature in the trusted execution environment.

3. The method of claim 1, wherein based on the image capturing instruction, capturing the infrared image and extracting the first feature of the infrared image in the trusted execution environment, and capturing the RGB image and extracting the second feature of the RGB image in the rich execution environment, comprises:
   when a second processor receives the image capturing instruction sent by a first processor, determining an image type based on the image capturing instruction;
   when the image type is a first type, sending, by the second processor through a first PWM (pulse width modulation) module, a pulse to a first controller to turn on a first light emitter in a camera module, capturing, by an infrared camera in the camera module, an infrared image corresponding to the first type and extracting the first feature of the infrared image, in the trusted execution environment; and
   when the image type is a second type, sending, by the second processor through a second PWM module, a pulse to a second controller to turn on a second light emitter in the camera module, capturing, by an RGB camera in the camera module, an RGB image corresponding to the second type and extracting the second feature of the RGB image, in the rich execution environment.

4. The method of claim 1, wherein based on the image capturing instruction, capturing the infrared image and the RGB image and extracting the first feature of the infrared image and extracting the second feature of the RGB image in the rich execution environment, comprises:
   when a second processor receives the image capturing instruction sent by a first processor, determining an image type based on the image capturing instruction;
   when the image type is a first type, sending, by the second processor through a first PWM (pulse width modulation) module, a pulse to a first controller to turn on a first light emitter in a camera module, capturing, by an infrared camera in the camera module, an infrared image corresponding to the first type and extracting the first feature of the infrared image, in the rich execution environment; and
   when the image type is a second type, sending, by the second processor through a second PWM module, a pulse to a second controller to turn on a second light emitter in the camera module, capturing, by an RGB camera in the camera module, an RGB image corresponding to the second type and extracting the second feature of the RGB image, in the rich execution environment.

5. The method of claim 3, wherein the first processor is connected to the second light emitter and the first light emitter via an inter-integrated circuit (I2C) bus; and
   the method further comprises:
   configuring the second light emitter and the first light emitter by the first processor via the I2C bus, when it is detected that the camera module is activated.

6. The method of claim 5, wherein the first processor is connected to the second light emitter via an I2C bus, and connected to the first light emitter via another I2C bus.

7. The method of claim 5, wherein the first processor is connected to the second light emitter and the first light emitter via a same I2C bus.

8. The method of claim 3, wherein a time point when the first PWM module sends the pulse to the first controller is different from a time point when the second PWM module sends the pulse to the second controller, and a time duration from the time point when the pulse is sent to the first controller to the time point when the pulse is sent to the second controller is less than a time threshold.

9. The method of claim 2, further comprising:
   generating a binary file and storing the binary file in the trusted execution environment.

10. The method of claim 2, further comprising:
generating a binary file and storing the binary file in the rich execution environment.

11. An electronic device, comprising a first processor, a second processor, and a camera module, wherein the first processor is configured to:
obtain an image capturing instruction;
based on the image capturing instruction, capturing an infrared image and extracting a first feature of the infrared image in a trusted execution environment, capturing an RGB image and extracting a second feature of the RGB image in a rich execution environment; or capturing the infrared image and the RGB image and extracting the first feature of the infrared image and extracting the second feature of the RGB image in the rich execution environment; and
perform an alignment operation based on the first feature and the second feature.

12. The electronic device of claim 11, wherein the first processor is further configured to:
in response to capturing the infrared image and extracting the first feature of the infrared image in the trusted execution environment, and capturing the RGB image and extracting the second feature of the RGB image in the rich execution environment, transmitting the second feature to the first trusted execution environment, and performing the alignment operation based on the first feature and the second feature in the trusted execution environment; or
transmitting the first feature to the rich execution environment and performing the alignment operation based on the first feature and the second feature in the rich execution environment; or
in response to capturing the infrared image and the RGB image, extracting the first feature of the infrared image and extracting the second feature of the RGB image in the rich execution environment, transmitting the first feature and the second feature to the trusted execution environment, and performing the alignment operation based on the first feature and the second feature in the trusted execution environment.

13. The electronic device of claim 11, wherein the second processor is configured to, when receiving the image capturing instruction sent by the first processor, determining an image type based on the image capturing instruction; and
wherein the first processor is configured to:
when the image type is a first type, obtain the infrared image corresponding to the first type and extract the first feature of the infrared image in the trusted execution environment, by activating a first light emitter in the camera module in response to sending, by the second processor through a first PWM (pulse width modulation) module, a pulse to a first controller and by capturing the infrared image by an infrared camera in the camera module; and
when the image type is a second type, obtain the RGB image corresponding to the second type and extract the second feature of the RGB image in the rich execution environment, by activating a second light emitter in the camera module in response to sending, by the second processor through a second PWM module, a pulse to a second controller and by capturing the RGB image by an RGB camera in the camera module.

14. The electronic device of claim 11, wherein the second processor is configured to, when receiving the image capturing instruction sent by the first processor, determining an image type based on the image capturing instruction; and
wherein the first processor is configured to:
when the image type is a first type, obtain the infrared image corresponding to the first type and extract the first feature of the infrared image in the rich execution environment, by activating a first light emitter in the camera module in response to sending, by the second processor through a first PWM (pulse width modulation) module, a pulse to a first controller and by capturing the infrared image by an infrared camera in the camera module; and
when the image type is a second type, obtain the RGB image corresponding to the second type and extract the second feature of the RGB image in the rich execution environment, by activating a second light emitter in the camera module in response to sending, by the second processor through a second PWM module, a pulse to a second controller and by capturing the RGB image by an RGB camera in the camera module.

15. The electronic device of claim 13, wherein the first processor is connected to the second light emitter and the first light emitter via an inter-integrated circuit (I2C) bus; and
the first processor is configured to:
configure the second light emitter and the first light emitter via the I2C bus, when it is detected that the camera module is activated.

16. The electronic device of claim 15, wherein the first processor is connected to the second light emitter via an I2C bus, and connected to the first light emitter via another I2C bus.

17. The electronic device of claim 15, wherein the first processor is connected to the second light emitter and the first light emitter via a same I2C bus.

18. The electronic device of claim 13, wherein a time point when the first PWM module sends the pulse to the first controller is different from a time point when the second PWM module sends the pulse to the second controller, and a time duration from the time point when the pulse is sent to the first controller to the time point when the pulse is sent to the second controller is less than a time threshold.

19. A non-transitory computer readable storage medium, having a computer program stored therein, wherein when the computer program is executed by a processor, a method for processing an image, in which the method comprises:
obtaining an image capturing instruction;
based on the image capturing instruction, capturing an infrared image and extracting a first feature of the infrared image in a trusted execution environment, and capturing an RGB image and extracting a second feature of the RGB image in a rich execution environment or capturing the infrared image and the RGB image and extracting the first feature of the infrared image and extracting the second feature of the RGB image in the rich execution environment; and
performing an alignment operation based on the first feature and the second feature.

20. The non-transitory computer readable storage medium of claim 19, wherein the method further comprises:
in response to capturing the infrared image and extracting the first feature of the infrared image in the trusted execution environment, and capturing the RGB image and extracting the second feature of the RGB image in the rich execution environment, transmitting the second feature to the trusted execution environment, and performing the alignment operation based on the first feature and the second feature in the trusted execution environment; or transmitting the first feature to the rich execution environment and performing the alignment operation based on the first feature and the second feature in the rich execution environment; and in response to capturing the infrared image and the RGB image and extracting the first feature of the infrared image and extracting the second feature of the RGB image in the rich execution environment, transmitting the first feature and the second feature to the trusted execution environment, and performing the alignment operation based on the first feature and the second feature in the trusted execution environment.

* * * * *